(12) United States Patent
Kang

(10) Patent No.: US 8,905,462 B2
(45) Date of Patent: Dec. 9, 2014

(54) ASYMMETRIC PASSENGER CAR

(76) Inventor: Hangoo Kang, Yongin-si (KR)

( * ) Notice: Subject to any disclaimer, the term of this patent is extended or adjusted under 35 U.S.C. 154(b) by 0 days.

(21) Appl. No.: 13/513,470

(22) PCT Filed: Jan. 27, 2011

(86) PCT No.: PCT/KR2011/000587
§ 371 (c)(1),
(2), (4) Date: Jun. 1, 2012

(87) PCT Pub. No.: WO2012/102425
PCT Pub. Date: Aug. 2, 2012

(65) Prior Publication Data
US 2013/0001981 A1   Jan. 3, 2013

(51) Int. Cl.
*B62D 39/00*   (2006.01)
*B62D 31/00*   (2006.01)

(52) U.S. Cl.
CPC .............. *B62D 39/00* (2013.01); *B62D 31/00* (2013.01)
USPC ..................................................... 296/181.1

(58) Field of Classification Search
USPC ......... 296/190.01, 63, 190.08, 146.15, 181.5, 296/181.1, 178, 180.1, 181.2; 297/232
See application file for complete search history.

(56) References Cited

U.S. PATENT DOCUMENTS

| | | | | |
|---|---|---|---|---|
| 2,267,509 | A | * | 12/1941 | Strong ..................... 296/190.01 |
| 4,108,488 | A | * | 8/1978 | Tantlinger .................. 296/96.19 |
| 4,233,904 | A | * | 11/1980 | Bugarcic .................... 104/138.1 |
| 4,668,003 | A | | 5/1987 | Ishizaki et al. |
| 2011/0049932 | A1 | * | 3/2011 | Hobenshield et al. ..... 296/190.1 |

FOREIGN PATENT DOCUMENTS

| | | |
|---|---|---|
| JP | 55170121 U | 12/1980 |
| JP | 61160368 A | 7/1986 |
| KR | 1019860008066 A | 11/1986 |
| KR | 2019990032067 U | 7/1999 |

OTHER PUBLICATIONS

International Search Report (in Korean) for PCT/KR2011/000587, mailed Oct. 26, 2011; ISA/KR.

* cited by examiner

*Primary Examiner* — Joseph D Pape
*Assistant Examiner* — Dana Ivey
(74) *Attorney, Agent, or Firm* — Harness, Dickey & Pierce, P.L.C.

(57) ABSTRACT

The present disclosure provides an asymmetric passenger car with a body including left and right sections differently formed and unbalanced in outer profiles. This is ground breaking to impart imaginations and vitality to design automobiles. Moreover, with its controllability over unauthorized design copies or abuses, the car companies would be enabled to prove their abilities in design depending on their distinctive technical skills. In addition, consumers will eventually be provided with cars full of imagination and personality.

13 Claims, 4 Drawing Sheets

⊢——Vertical Section (reference cross-section)

*100*

*200*

|———Vertical Section (reference cross-section)

400

500

600

ASYMMETRIC PASSENGER CAR

TECHNICAL FIELD

The present disclosure relates to an asymmetric car. More specifically, the present disclosure relates to an asymmetric passenger car exhibiting unique design features to the car exterior by designing a car body to be latitudinally asymmetric and therefore broadening design perspective of automobiles.

BACKGROUND

The statements in this section merely provide background information related to the present disclosure and may not constitute prior art.

History of the automobile development shows mass production cars of consistent symmetric designs with exceptions of special purpose vehicles. Automobile is certainly a machine engaged in speed and has been shaped to be truly symmetrical view from front or back to overcome the resistance of air and keep balance for appropriate operation. This notion is considered to have become an unchallenged stereotype in the automobile design. This myth might have been a set control over our imagination, which reveals another example of constraint by social stereotypes. In practice, stereotypical thoughts often impact people with greater influences than institutions and rules.

Because of such constraints due to stereotype, automobile designs have had more difficulties in terms of design diversity than otherwise could have been realized. It is also true that the current automobile industry is keen to seek a solution to these constraints.

The fixed idea that a car must be symmetrical would only mold a substantial part of the car designers' creative endeavors. As a result, mass passenger cars of more diverse and exotic shapes are precluded from actually running on the road. This should have taken consumers away from the pleasant chance for more diverse choices they deserve to experience.

DISCLOSURE

Technical Problem

Therefore, the present disclosure seeks to provide an asymmetrical alternative of commercial car design which encourages car designers to have more creative mind about car design and liberates them from the obsolete perspectives of the car design to a new breakthrough, whereby the success of highly imaginative and stylized design variety can be shared with the consumers.

SUMMARY

An embodiment of the present disclosure provides an asymmetric passenger car having a body with an asymmetric exterior.

Such an asymmetric passenger car is characterized by the body being contoured so that a relative asymmetry is given between a pair of vertical body sections in parallel to and equally spaced from a reference vertical cross section formed of a vertical plane passing through the centers of both wheel treads of front wheels and rear wheels and extending longitudinally through the asymmetric passenger car.

Another embodiment of the present disclosure provides an asymmetric passenger car contoured so that a front side or a rear side of the car is withdrawn to visually expose at least part of a left or right wheel when viewed from the top of the car.

Yet another embodiment of the present disclosure provides an asymmetric passenger car having a body contoured so that imaginary lateral sections of the body bisected along a reference vertical cross section passing through the center of both wheel treads of front wheels and rear wheels and longitudinally extending through the asymmetric passenger car have different lateral widths measured at opposite distal ends of the body from the reference cross section along a perpendicular straight line.

The passenger car according to an embodiment of the present disclosure may have two or more of the above-mentioned features combined.

Advantageous Effects

Departing from the conventional notion of symmetrical shaping of the bodywork of the car, the present disclosure as mentioned above allows the asymmetric design into distinctive left and right sections of the car body, which further increases the degree of freedom of the automobile design with a full vitality from imaginative power. In addition, such diversity of car design inherently precludes ubiquitous lookalikes to one another or characteristic designs being copied in the automobile industry. Besides, the combination of technical challenges and creative design will facilitate car companies to demonstrate sharp distinctions both in technology and design abilities to their advantage.

Consumers will be ensured to experience truly distinctive and fully vital automobiles which are unprecedented culmination of free imagination that comes into being actual products to choose and possess.

DETAILED DESCRIPTION

Figure 1:
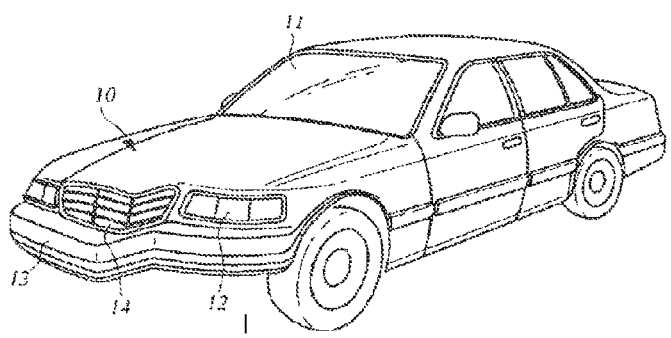
FIG. 1 is a perspective view of an asymmetric car according to a first embodiment of the present disclosure.

Powered by an engine mounted in its body, automobiles run on the road transporting people or loads. Typically, an automobile is structurally separated by a body and a chassis. The body is a section for carrying the riders or loads and comprises a passenger compartment, an engine compartment, and a trunk. The chassis refers to a group of minimum operating mechanisms including an engine, a powertrain, wheels, a suspension, a steering system, and a brake system.

Terminology will be defined for the purpose of describing the asymmetric car according to the present disclosure.

Firstly, the cars in the specification and drawings are exclusive to passenger cars, SUVs or mini vans. This is because existing special purpose cars are consequently asymmetrical and the design-sensitive automobile classes are the passenger cars, SUVs and mini vans.

In addition, since the engine compartment and trunk may be located respectively at the front and rear of the car or vice versa or the trunk may be occasionally omitted, the present specification names the front side of the car body a front section, designating the rear side of the car body as a rear section. Here, the car front section means the area encompassing the front end of the passenger compartment to the front distal end of the car body (i.e., a bumper or a radiator grille if it overhangs the bumper). The car rear section means the area extending from the rear end of the passenger compartment to the rear distal end of the car body (bumper). However, the passenger compartment between the front section and the rear section will be called by the same name as usual.

Left and right sides of the car body as used herein mean imaginary lateral halves of the body divided with reference to a vertical section (hereinafter called reference cross section) passing both the center of wheel treads of the front wheels and the center of wheel treads of the rear wheels and extending longitudinally of the car.

In particular, the asymmetric shape in this specification means the outer profile surface of the car body. Here, the outer profile is defined as the outer surface excluding the bottom of the car. In addition, the outer profile excludes concaves or depressions which are inevitably formed when various components of the car body are connected. For example, areas to be ignored are clearances and raised spots between the bumpers and the car body, between respective lights and the body, between doors and the body, between a fuel door (cap included) and the body, between door handles and the body, etc.

In addition, the asymmetric shape in this specification excludes car shapes in a symmetrical overall profile with doors closed even if they have unequal number of doors such as one and two at opposite sides. Excluded also are possibly asymmetric profile features such as respective lights, a radiator grille, windshield and rear window if they do not influence the outer profile of the car body.

Further, the asymmetric shape in this specification does not mean an asymmetry generated by an attachment or absence of a part. For example, a car with only one side mirror, a car with a tail muffler visible at one side only in a rear view, a car with an air intake protruded from the hood at one side only, or a car with a license plate attached closer to one side departs from the idea of the present disclosure. In other words, the present disclosure does not encompass a car shape that lost its symmetry from an attachment or absence of a singular unpaired component despite its influence on the car profile. Additionally, the present disclosure does not involve a device for fastening a single component or a deformation of a mounting surface for the fastening.

As the body of the present disclosure is designed asymmetrically, the asymmetric car may have laterally changing lengths at the front section, rear section, or passenger compartment; laterally changing heights at the front section, rear section, or passenger compartment; or laterally changing widths. These features may also be combined.

Hereinafter, aspects of the present disclosure will be described in detail with reference to the accompanying drawings. In the following description, like reference numerals designate like elements although they are shown in different drawings. Further, in the following description of the present disclosure, a detailed description of known functions and configurations incorporated herein will be omitted for the purpose of clarity.

FIG. 1 is a perspective view of an asymmetric car according to a first embodiment of the present disclosure.

Asymmetric car 100 in the first embodiment has different lengths laterally of a front section 10. Specifically, if the car is bisected with reference to the above-mentioned reference cross section into a left half and a right half obtaining a pair of vertical body cross sections (virtual planes), which are equally spaced laterally from and parallel to the reference vertical cross section, front section 10 of car 100 is characteristically formed with different lengths at the vertical body cross sections.

Such front section 10 of asymmetric car 100 is shaped so that it has a side headlight 12, its corresponding bumper 13, and a radiator grille 14 at one side which are recessed toward a windshield 11 or advanced relative to an opposite side headlight, its corresponding headlight, or a radiator grille at the other side.

The car body corresponding to front section 10 of asymmetric car 100 may be constructed by welding or fastening individually formed sectional modules of appropriate sizes and shapes into an assembly. Alternatively, an asymmetric body may be formed in one piece and then mounted on the frame of the car.

In addition, the left and right headlights at front section 10 of asymmetric car 100 may be also asymmetric, which is not meant to be simply two-dimensional but three-dimensional in the asymmetrical shaping by protruding or recessing headlight of one side relative to that of the other side. Radiator grille 14 may be readily formed into three-dimensional asymmetric sections.

Figure 2:
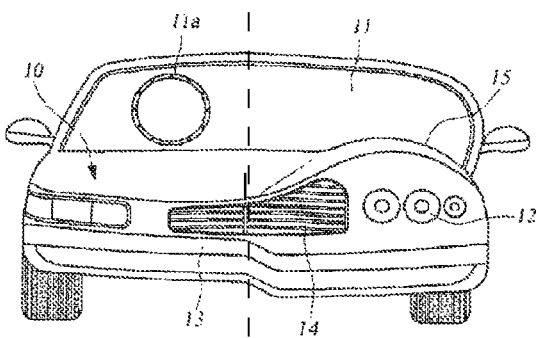
FIG. 2 is a front elevational view of an asymmetric car according to a second embodiment of the present disclosure.

FIG. 2 is a front elevational view of an asymmetric car 200 according to a second embodiment of the present disclosure.

Asymmetric car 200 in the second embodiment has different heights laterally of front section 10. Specifically, if the car is bisected with reference to the reference cross section into a left half and a right half obtaining a pair of vertical body cross sections which are equally spaced laterally from and parallel to the reference vertical cross section, front section 10 of car 200 is characteristically formed with different vertical lengths at the vertical body cross sections.

Such front section 10 of asymmetric car 200 is shaped so that it has a hood 15 (or trunk), bumper 13, headlight 12, a fender, etc. which are at one side and raised or recessed or depressed relative to the respective counterparts at the other side. Another variation may be hood 15 formed obliquely from left to right or vice versa.

In addition, windshield 11 may be shaped to be laterally asymmetrical. For example, large and broad glass may be adopted to secure a sufficient view at one side and a porthole 11a in windshield 11 resembling a submarine porthole may be installed at the other side. In particular, the windshield may be formed as laterally tilted as illustrated in FIG. 2.

As in the first embodiment described above, the left and right headlights at front section 10 of asymmetric car 200 may be also asymmetrical three-dimensionally, and radiator grille 14 may be formed into three-dimensional asymmetric sections.

Meanwhile, asymmetric car 200 in the second embodiment also has front section 10 formed with left and right sections having different widths from each other. Specifically, if the car is bisected with reference to the reference cross section into a left half and a right half to measure the respective widths from the reference vertical cross section to lateral ends of the car body, front section 10 of car 200 is characteristically defined by different widths from the left to right halves.

Not only with such front section 10, asymmetric car 200 may also be relatively depressed toward or protruded from the reference cross section at either left or right aspect of a rear section or doors of the passenger compartment.

Figure 3:
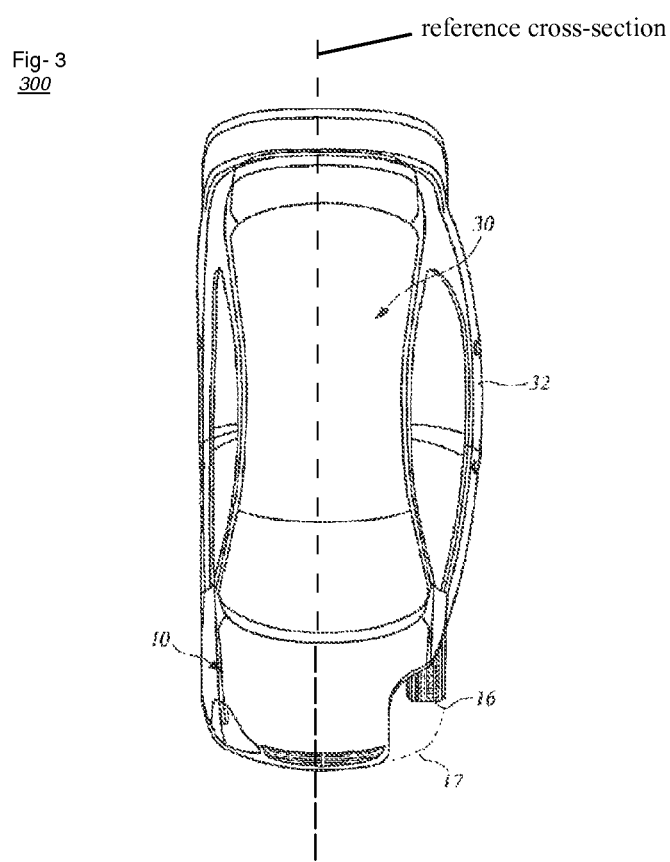
FIG. 3 is a plan view of an asymmetric car according to a third embodiment of the present disclosure.

FIG. 3 is a plan view of an asymmetric car according to a third embodiment of the present disclosure.

Asymmetric car 300 in the third embodiment is characterized by a recession at front section 10 of car 300 to have either one of left and right wheels 16 exposed at least partially from the car body when viewed from the top of car 300. Although not depicted, a peripheral wheel guard or gutter may be mounted about the exposed wheel. In addition, an invisibly clear overlay 17 of a transparent or translucent material may be further provided to reduce the unbalance of aerodynamic resistance, as shown by the dotted line in FIG. 3. In particular, it shall be defined as 'asymmetry' even if the clear overlay 17 is covered so that the car remains in the shape of symmetry whereas the transparent inner shape of the car remains asymmetrical.

Such front section 10 of car 300 is partially removed at either side with at least part of front wheel 16 being exposed. Accordingly, a headlight at one side and its adjacent bumper section may be omitted, although not necessarily limited thereto.

Meanwhile, FIG. 3 also illustrates the car body having different widths at its left and right halves by shaping either left or right doors of the passenger compartment so that the doors at one side are in recession or protrusion relative to the opposite doors toward or away from the reference cross section.

Figure 4:
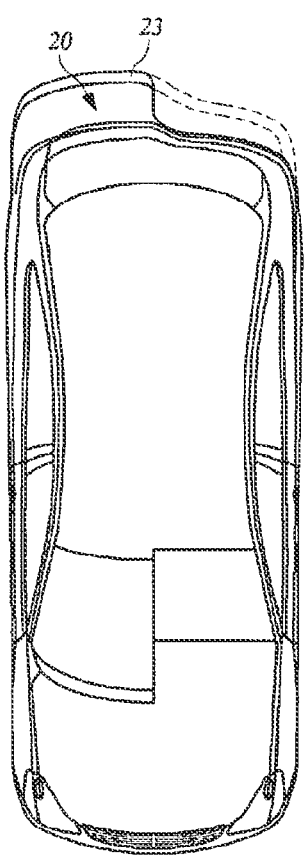
FIG. 4 is a plan view of an asymmetric car according to a fourth embodiment of the present disclosure.

FIG. 4 is a plan view of an asymmetric car according to a fourth embodiment of the present disclosure.

As illustrated in FIG. 4, asymmetric car 400 in the fourth embodiment has rear section 20 formed unlike in its left and right halves. Specifically, if the car is bisected with reference to the above-mentioned reference cross section into a left half and a right half obtaining a pair of vertical body cross sections which are equally spaced laterally from and parallel to the reference vertical cross section, rear section 20 of car 400 is defined by different lengths in the left and right sections.

Such rear section 20 of asymmetric car 400 is shaped so that it has a tail light (not shown) and its adjacent bumper 23 region which are at one side and recessed toward or protruded away from the passenger compartment relative to the respective counterparts at the other side. Bumper 23 may be shaped to have an abrupt bend or break near the center of the car body or rather smoothly contoured as depicted by the dotted line in FIG. 4.

The car body corresponding to rear section 20 of asymmetric car 400 may be formed by welding or fastening individually formed sectional modules of appropriate sizes and shapes into an assembly. Alternatively, an asymmetric body may be formed in one piece at the outset and then mounted to the frame of the car.

The left and right tail lights mounted on rear section 20 of asymmetric car 400 may also be asymmetric, which is not meant to be simply two-dimensional but three-dimensional, e.g., by protruding or recessing one side tail light relative to the other side counterpart.

On the other hand, FIG. 4 illustrates a windshield advanced at one side from a retreated window at the other side.

Figure 5:
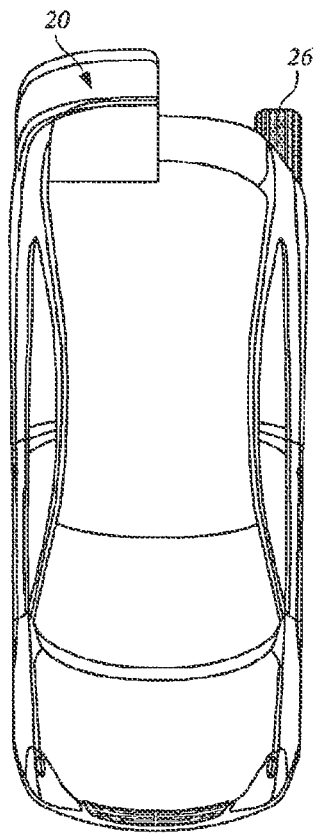
FIG. 5 is a plan view of an asymmetric car according to a fifth embodiment of the present disclosure.

FIG. 5 is a plan view of an asymmetric car according to a fifth embodiment of the present disclosure.

Similar to the embodiment of FIG. 3, asymmetric car 500 in the fifth embodiment is characterized by a recessed aspect of rear section 20 of car 500 to leave either one of left and right wheels 26 exposed at least partially from the car body when viewed from top.

The rear section 20 of such asymmetric car 500 is partially removed at either side with at least part of rear wheel 26 being exposed. Accordingly, a tail light at one side and its nearby bumper section may be omitted, although not necessarily limited thereto.

On the other hand, FIG. 5 illustrates an overhang at one side of the rear window.

Figure 6:
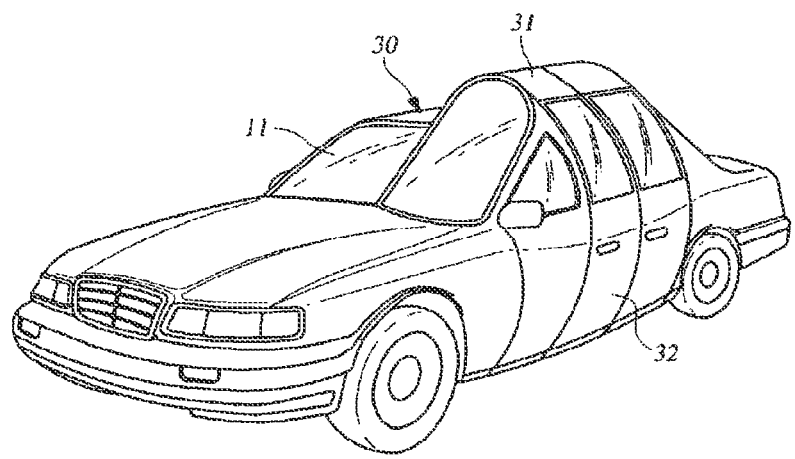
FIG. 6 is a perspective view of an asymmetric car according to a sixth embodiment of the present disclosure.

FIG. 6 is a perspective view of an asymmetric car according to a sixth embodiment of the present disclosure.

Asymmetric car 600 in the sixth embodiment has a passenger compartment 30 shaped different in its left and right sides. Specifically, if the car is bisected with reference to the reference cross section into a left half and a right half obtaining a pair of vertical body cross sections which are equally spaced laterally from and parallel to the reference vertical cross section, passenger compartment 30 of car 600 is defined by different vertical lengths at the vertical body cross sections.

Such passenger compartment 30 of asymmetric car 600 is shaped so that it has a roof 31 which is at one side and raised relative to the other side. Another variation may be roof 31 shaped oblique from left to right or vice versa.

Windshield 11 or a rear window in its three-dimensional shape may be also asymmetrical, and in particular, the windshield or rear window at the left and right sides may be mounted to have distinctive gradients or heights as illustrated in FIG. 6.

In the case of the passenger door at the higher side of roof 31, a hinge may be provided to vertically swivel the door open and close although it is not so limited in structure but may open as in both front and rear-hinged doors.

Meanwhile, FIG. 6 also illustrates a car body having different widths in its left and right halves by shaping either left or right doors of passenger compartment 30 convex or concave.

Two or more unique features embodied in the foregoing first to sixth embodiments may be combined with each other.

For example, when the features of the first and fourth embodiments are combined, the lengths of front section 10 and rear section 20 will differ from each other.

The front section 10 of asymmetric car 100 is shaped so that it has a headlight 12 at one side and its nearby bumper 13 which are recessed toward windshield 11 or advanced away from the windshield relative to the opposite side. In addition, rear section 20 is also shaped so that it has a tail light at one side and its nearby bumper 23 which are recessed toward the passenger compartment or advanced away from the compartment relative to the opposite side.

Moreover, the left and right headlights at front section 10 of the asymmetric car may be in a three-dimensional asymmetry, and radiator grille 14 may be also formed into three-dimensional asymmetry.

The asymmetry in the asymmetric car may extend diagonally. For instance, the front end advances at the right side and the rear end extends at the left side. Unlimited to being so diagonal, the asymmetric car may have one side shorter than the other side which is implemented by a hybrid form with one lateral half being generally longer than the other lateral half, for example.

Alternatively, when the features of the first and sixth embodiments are combined, the length of front section 10 differs from the left to right sides while passenger compartment 30 has differences in heights and widths.

Front section 10 of such asymmetric car is shaped so that it has a headlight 12 at one side and its nearby bumper 13 which are recessed toward windshield 11 or advanced away from the windshield relative to the opposite side. Additionally, passenger compartment 30 has a contoured roof 31 which is raised or recessed at one side relative to the counterpart at the other side. Passenger compartment 30 also has doors at one side protruded or recessed than those at the opposite side.

In addition, the left and right headlights 12 mounted on front section 10 of the asymmetric car may be in a three-dimensional asymmetry, and radiator grille 14 may be also formed into three-dimensional asymmetry. Windshield 11 or the rear window may also be formed asymmetrical.

Furthermore, with roof 31 relatively elevated at the left or right side of passenger compartment 30, the same side of front section 10 and/or rear section as the elevated side of passenger compartment 30 may be substantially longer than the opposite side. At the same time, a passenger door located at the elevated side of roof 31 may be provided with an upper hinge to vertically swivel the door open and close and the opposite door may be made to slide back and forth.

As mentioned above, in actual drive on the road, the asymmetric cars will be subject to torque due to uneven air resistance or running into vibrations from the inherent structural asymmetry in terms of aerodynamics. Such side effects can be overcome by such technologies as, e.g., counter-torque or vibration cancellation. Covering with transparent overlay 17 as described with reference to FIG. 3 may be a simplest example.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

The invention claimed is:

1. An asymmetric passenger car comprising:
an outer body defining a passenger compartment;
wherein the outer body is contoured so that a relative asymmetry is provided between a pair of vertical body sections extending in parallel on opposite sides of a plane extending along a length of the passenger car midway between front wheels and midway between rear wheels of the passenger car; and
wherein a front section or a rear section of the asymmetric passenger car is formed to be depressed to visually expose at least part of a left or right one of the front wheels and rear wheels from the body when viewed from a top of the asymmetric passenger car.

2. The asymmetric passenger car as claimed in claim 1, wherein a front section of the asymmetric passenger car has a left or a right half elevated or depressed relative to each other.

3. The asymmetric passenger car as claimed in claim 2, wherein at the front section one of the left half or the right half is inclined with respect to the other of the left half or the right half.

4. The asymmetric passenger car as claimed in claim 1, wherein one or more of a bumper, radiator grille, headlight, tail light, windshield, or rear window are asymmetrical.

5. The asymmetric passenger car as claimed in claim 1, wherein the asymmetric passenger car further includes a clear overlay of a transparent or translucent material provided around a depression of the front section or the rear section of the asymmetric passenger car.

6. An asymmetric passenger car comprising:
a pair of front wheels and a pair of rear wheels;
a body mounted over the front wheels and the rear wheels, a longitudinal axis of the car extends between a front end and a rear end of the body midway between the front wheels and the rear wheels;
a passenger compartment defined by the body;
a first side of the body and a second side of the body on opposite sides of the longitudinal axis, the first side is asymmetrical with respect to the second side; and
a first front section of the body and a second front section of the body on opposite sides of the longitudinal axis, the first front section is asymmetrical with respect to the second front section;
wherein first headlights at the first side are shaped differently than second headlights at the second side.

7. The asymmetric passenger car of claim 6, wherein at the front end of the car the first side has a greater height than the second side.

8. The asymmetric passenger car of claim 6, wherein a grill at the front end of the car is taller on the first side than on the second side.

9. The asymmetric passenger car of claim 6, wherein the body defines a recess at least partially exposing a wheel of one of the pair of front wheels when viewed from a top of the car.

10. The asymmetric passenger car of claim 9, further comprising a transparent cover mounted to the body at the recess to cover the wheel.

11. The asymmetric passenger car of claim 9, further comprising a peripheral wheel guard mounted to the body and extending about the wheel.

12. The asymmetric passenger car of claim 9, further comprising a bumper, a radiator grill, headlights, tail lights, a windshield, and a rear window, one or more of which are asymmetrical at the first side as compared to the second side.

13. An asymmetric passenger car comprising:
a pair of front wheels and a pair of rear wheels;
a body mounted over the front wheels and the rear wheels, a longitudinal axis of the car extends between a front end and a rear end of the body midway between the front wheels and the rear wheels;
a passenger compartment defined by the body;
a first side of the body and a second side of the body on opposite sides of the longitudinal axis, the first side is asymmetrical with respect to the second side; and
a first front section of the body and a second front section of the body on opposite sides of the longitudinal axis, the first front section is asymmetrical with respect to the second front section; and
wherein a grill at the front end of the car is taller on the first side than on the second side.

\* \* \* \* \*